United States Patent
Sakurai et al.

(10) Patent No.: US 8,155,972 B2
(45) Date of Patent: Apr. 10, 2012

(54) SEAMLESS AUDIO SPEED CHANGE BASED ON TIME SCALE MODIFICATION

(75) Inventors: Atsuhiro Sakurai, Tsukuba (JP); Yoshihide Iwata, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 951 days.

(21) Appl. No.: 11/244,360

(22) Filed: Oct. 5, 2005

(65) Prior Publication Data

US 2007/0078662 A1    Apr. 5, 2007

(51) Int. Cl.
  *G10L 21/04* (2006.01)
  *G10L 19/14* (2006.01)
  *G10L 19/00* (2006.01)
  *G10L 13/00* (2006.01)
  *G10L 13/06* (2006.01)

(52) U.S. Cl. ........ 704/503; 704/211; 704/216; 704/217; 704/218; 704/258; 704/267

(58) Field of Classification Search .......... 704/503–504, 704/211
  See application file for complete search history.

(56) References Cited

U.S. PATENT DOCUMENTS

| | | | | |
|---|---|---|---|---|
| 5,175,769 A * | 12/1992 | Hejna et al. | | 704/211 |
| 5,920,840 A * | 7/1999 | Satyamurti et al. | | 704/267 |
| 6,484,137 B1 * | 11/2002 | Taniguchi et al. | | 704/211 |
| 6,487,536 B1 * | 11/2002 | Koezuka et al. | | 704/500 |
| 6,718,309 B1 * | 4/2004 | Selly | | 704/503 |
| 6,801,898 B1 * | 10/2004 | Koezuka | | 704/500 |
| 6,982,377 B2 * | 1/2006 | Sakurai et al. | | 84/654 |
| 7,337,108 B2 * | 2/2008 | Florencio et al. | | 704/208 |
| 2006/0100885 A1 * | 5/2006 | Oh | | 704/503 |
| 2006/0277052 A1 * | 12/2006 | He et al. | | 704/503 |
| 2007/0168188 A1 * | 7/2007 | Choi | | 704/211 |

OTHER PUBLICATIONS

Dorran, David. Lawlor, Robert. Time-scale Modification of Music Using a subband approach based on the bark scale. 2003 IEEE Workshop on Applications of Signal Processing to Audio and Acoustics. pp. 173-176.*

* cited by examiner

*Primary Examiner* — David R Hudspeth
*Assistant Examiner* — Matthew Baker
(74) *Attorney, Agent, or Firm* — Robert D. Marshall, Jr.; W. James Brady; Frederick J. Telecky, Jr.

(57) ABSTRACT

This invention involves time-scale modification of audio signals. The invention describes overlap and add time scale modification with variable input and output buffer sizes. Seamless speed change is achieved by keeping track of previously processed data to avoid discontinuities during playback speed transitions.

10 Claims, 4 Drawing Sheets

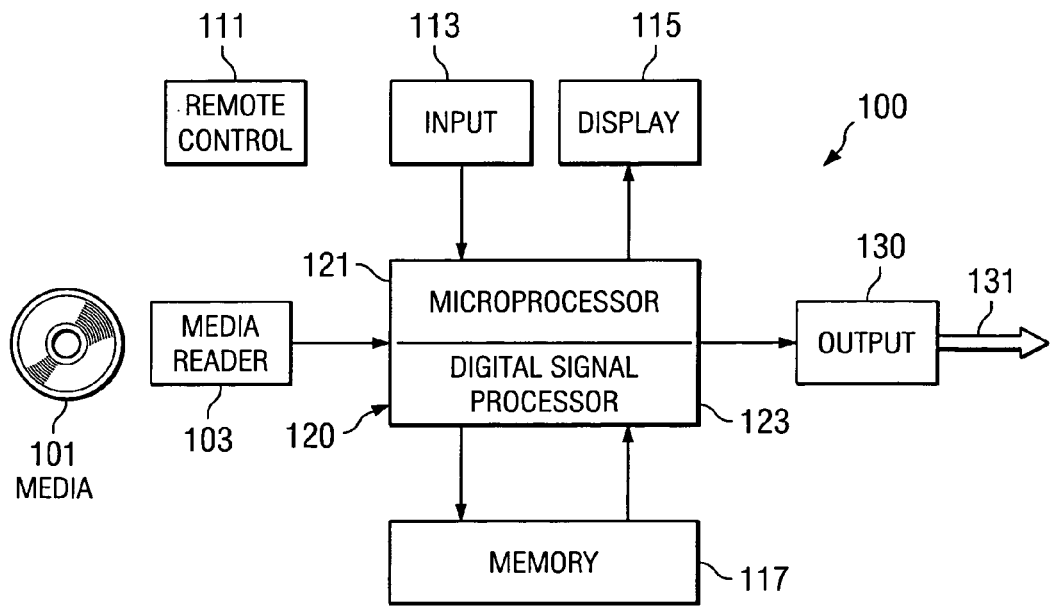
FIG. 1
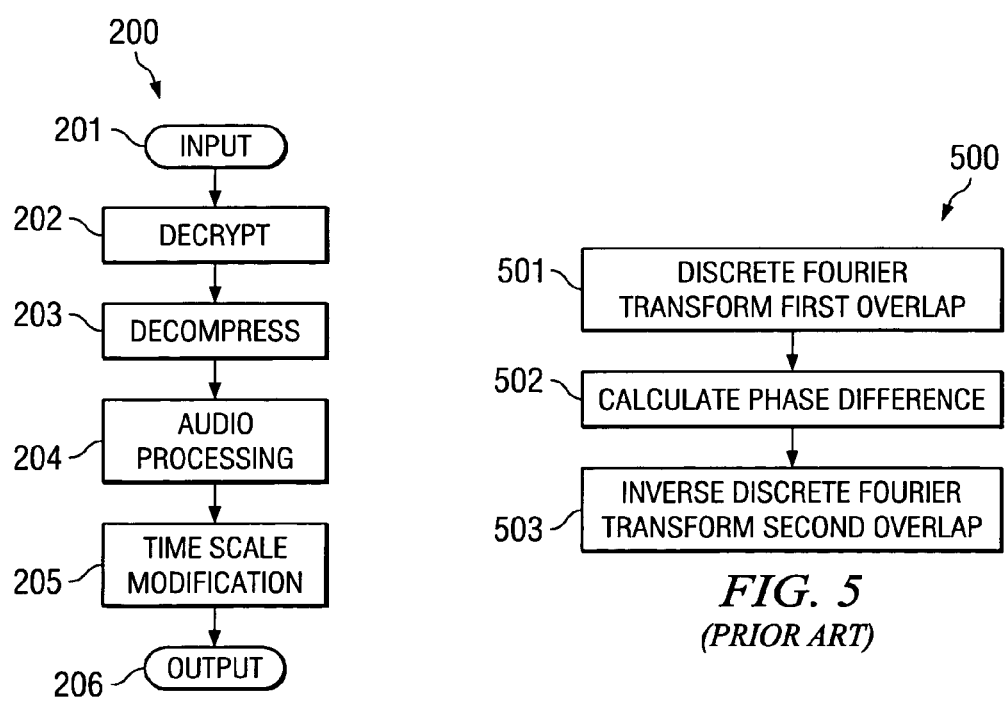
FIG. 2
FIG. 5
(PRIOR ART)

SEAMLESS AUDIO SPEED CHANGE BASED ON TIME SCALE MODIFICATION

TECHNICAL FIELD OF THE INVENTION

The technical field of this invention is digital audio time scale modification.

BACKGROUND OF THE INVENTION

Time-scale modification (TSM) is an emerging topic in audio digital signal processing due to the advance of low-cost, high-speed hardware that enables real-time processing by portable devices. Possible applications include intelligible sound in fast-forward play, real-time music manipulation, foreign language training, etc. Most time scale modification algorithms can be classified as either frequency-domain time scale modification or time-domain time scale modification. Frequency-domain time scale modification provides higher quality for polyphonic sounds, while time-domain time scale modification is more suitable for narrow-band signals such as voice. Time-domain time scale modification is the natural choice in resource-limited applications due to its lower computational cost.

The basic operation of time domain time-scale modification is successively overlapping and adding audio frames, where time scaling is achieved by changing the spacing between them. It is known in the art to calculate the exact overlap point based on a measure of similarity between the signals to be overlapped. This measure of similarity is generally based on cross-correlation.

Most time-domain time-scale modification algorithms are derived from the synchronous overlap-and-add method (SOLA). The synchronous overlap-and-add algorithm and its variations are based on successive overlap and addition of audio frames. For the overlap, the overlap point is adjusted by computing a measure of signal similarity between the overlapping regions for each possible overlap position, which is limited by a minimum and maximum overlap points. The position of maximum similarity is selected. The signal similarity measure can be represented as a full cross-correlation function or simplified versions. This similarity calculation represents about 80% or more of the total computation required by the algorithm.

Even though SOLA based methods represent an attractive low-cost solution to the time-scale modification problem, their limitation stands out in the case of polyphonic music signals. Their intrinsic problem is that the audio signal is treated as a whole without consideration for its individual frequency components, so that the overlap point adjustment based on signal similarity cannot simultaneously generate smooth transitions for the multiple frequency components of the signal.

A family of methods known as phase vocoder does time-scale modification in the frequency domain. The input signal is analyzed at equally spaced overlapping windowed frames using a short-time discrete Fourier transform. Next the phase difference for spectral peaks is calculated. This phase difference is the difference in phase between an input phase and a time scale modified signal phase. An intrinsic sinusoidal model is generally used. The frequency is represented by the sum $\Omega_k + \omega_{ik}$: where carrier $\Omega_k$ is $2\pi k/N$; and $\omega_{ik}$ is an instantaneous frequency modulator. This produces an estimate $\omega_{ik}$ for each spectral line by obtaining the phase difference between two consecutive analysis frames. Here, k is a spectral line number and N is the size of the short-time discrete Fourier transform. The process reconstructs an output signal from the analyzed frames using a short-time inverse discrete Fourier transform. The frames are overlapped by a different overlap factor to achieve the desired time scaling. The instantaneous frequency $\omega_{ik}$ is used to calculate the phase corresponding to each spectral line in the time shifted instant.

Even though phase vocoders can potentially achieve higher quality than time-domain methods, a severe limitation is the large amount of computation required in the forward and inverse discrete Fourier transforms and also in the spectrum manipulation process. Practical implementations on fixed-point processors result in a computational cost up to 10 times higher than time-domain time-scale modification methods. In addition, maintaining phase coherence between frames is not an easy task and can be the source of artifacts.

SUMMARY OF THE INVENTION

This invention involves time-scale modification of audio signals. The invention describes overlap and add time scale modification with variable input and output buffer sizes, where the time scale is modified in a seamless manner by keeping track of previously processed data.

BRIEF DESCRIPTION OF THE DRAWINGS

These and other aspects of this invention are illustrated in the drawings, in which:

FIG. 1 is a block diagram of a digital audio system to which this invention is applicable;

FIG. 2 is a flow chart illustrating the data processing operations involved in time-scale modification employing the digital audio system of FIG. 1;

FIG. 5 is a flow chart illustrating the steps in the prior art phase vocoder time scale modification technique;

DETAILED DESCRIPTION OF PREFERRED EMBODIMENTS

Figure 3A:
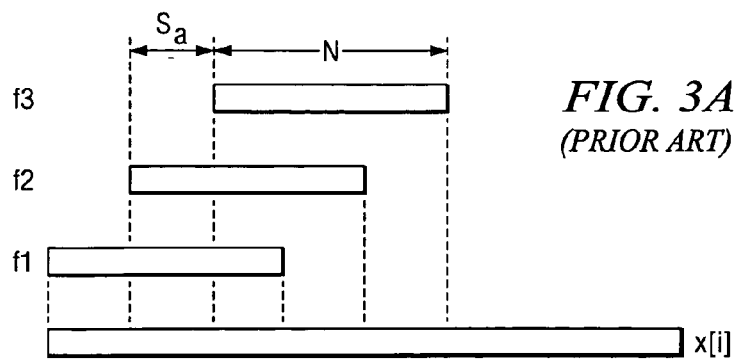
FIG. 3a illustrates the analysis step in the overlap and add method of time scale modification according to the prior art.

FIG. 1 is a block diagram illustrating a system to which this invention is applicable. The preferred embodiment is a DVD player or DVD player/recorder in which the time scale modification of this invention is employed with fast forward or slow motion video to provide audio synchronized with the video in these modes.

System 100 received digital audio data on media 101 via media reader 103. In the preferred embodiment media 101 is a DVD optical disk and media reader 103 is the corresponding disk reader. It is feasible to apply this technique to other media and corresponding reader such as audio CDs, removable magnetic disks (i.e. floppy disk), memory cards or similar devices. Media reader 103 delivers digital data corresponding to the desired audio to processor 120.

Processor 120 performs data processing operations required of system 100 including the time scale modification of this invention. Processor 120 may include two different processors, microprocessor 121 and digital signal processor 123. Microprocessor 121 is preferably employed for control functions such as data movement, responding to user input and generating user output. Digital signal processor 123 is preferably employed in data filtering and manipulation functions such as the time scale modification of this invention. A Texas Instruments digital signal processor from the TMS320C5000 family is suitable for this invention.

Processor 120 is connected to several peripheral devices. Processor 120 receives user inputs via input device 113. Input device 113 can be a keypad device, a set of push buttons or a receiver for input signals from remote control 111. Input device 113 receives user inputs which control the operation of system 100. Processor 120 produces outputs via display 115. Display 115 may be a set of LCD (liquid crystal display) or LED (light emitting diode) indicators or an LCD display screen. Display 115 provides user feedback regarding the current operating condition of system 100 and may also be used to produce prompts for operator inputs. As an alternative for the case where system 100 is a DVD player or player/recorder connectable to a video display, system 100 may generate a display output using the attached video display. Memory 117 preferably stores programs for control of microprocessor 121 and digital signal processor 123, constants needed during operation and intermediate data being manipulated. Memory 117 can take many forms such as read only memory, volatile read/write memory, nonvolatile read/write memory or magnetic memory such as fixed or removable disks. Output 130 produces an output 131 of system 100. In the case of a DVD player or player/recorder, this output would be in the form of an audio/video signal such as a composite video signal, separate audio signals and video component signals and the like.

FIG. 2 is a flow chart illustrating process 200 including the major processing functions of system 100. Flow chart 200 begins with data input at input block 201. Data processing begins with an optional decryption function (block 202) to decode encrypted data delivered from media 101. Data encryption would typically be used for control of copying for theatrical movies delivered on DVD, for example. System 100 in conjunction with the data on media 101 determines if this is an authorized use and permits decryption if the use is authorized.

The next step is optional decompression (block 203). Data is often delivered in a compressed format to save memory space and transmit bandwidth. There are several motion picture data compression techniques proposed by the Motion Picture Experts Group (MPEG). These video compression standards typically include audio compression standards such as MPEG Layer 3 commonly known as MP3. There are other audio compression standards. The result of decompression for the purposes of this invention is a sampled data signal corresponding to the desired audio. Audio CDs typically directly store the sampled audio data and thus require no decompression.

The next step is audio processing (block 204). System 100 will typically include audio data processing other than the time scale modification of this invention. This might include band equalization filtering, conversion between the various surround sound formats and the like. This other audio processing is not relevant to this invention and will not be discussed further.

The next step is time scale modification (block 205). This time scale modification is the subject of this invention and various techniques of the prior art and of this invention will be described below in conjunction with FIGS. 3 to 6. Flow chart 200 ends with data output (block 206).

Figure 3B:
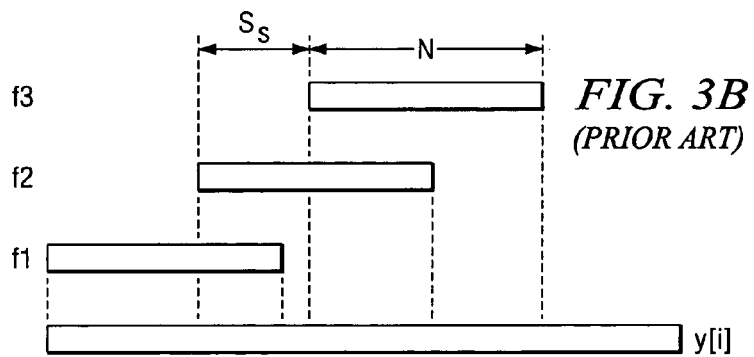
FIG. 3b illustrates the synthesis step in the overlap and add method of time-scale modification according to the prior art.

FIG. 3 illustrates this process. In FIG. 3(a), x(i) is the analysis signals represented as a sequence with index i. Similarly, FIG. 3(b) illustrates synthesis signal y(i) having a sequence index i. The quantity N is the frame size. $S_a$ is the analysis frame interval between consecutive frames $f_j$ (where j=1, 2 . . . ). $S_s$ is the similar synthesis frame interval. The relationship between the analysis frame interval $S_a$ and the synthesis frame interval $S_s$ sets the time scale modification. The overlap-and-add time scale modification algorithm is simple and provides acceptable results for small time-scale factors. In general this method yields poor quality compared to other methods described below.

The synchronous overlap-and-add time scale modification algorithm is an improvement over the previous overlap-and-add approach. Instead of using a fixed overlap interval for synthesis, the overlap point is adjusted by computing the normalized cross-correlation between the overlapping regions for each possible overlap position within minimum and maximum deviation values. The overlap position of maximum cross-correlation is selected. The cross-correlation is calculated using the following formula, where $L_k$ is the length of the overlapping window:

$$R[k] = \frac{\sum_{i=0}^{L_k-1} y[mS_s + k + i]x[mS_a + i]}{\left[\sum_{i=0}^{L_k-1} y^2[mS_s + k + i] \sum_{i=0}^{L_k-1} x^2[mS_a + i]\right]^{1/2}} \quad (1)$$

Figure 4A:
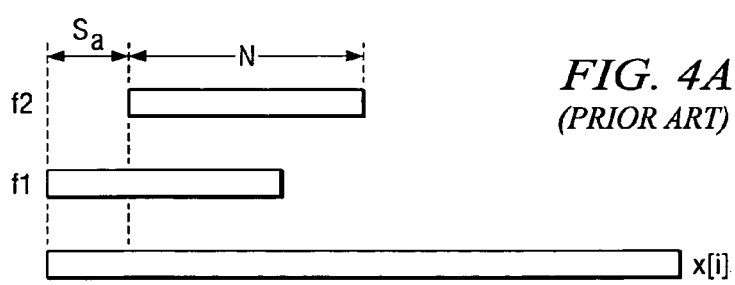
FIG. 4a illustrates the analysis step in synchronous overlap and add method of time scale modification according to the prior art.
Figure 4B:
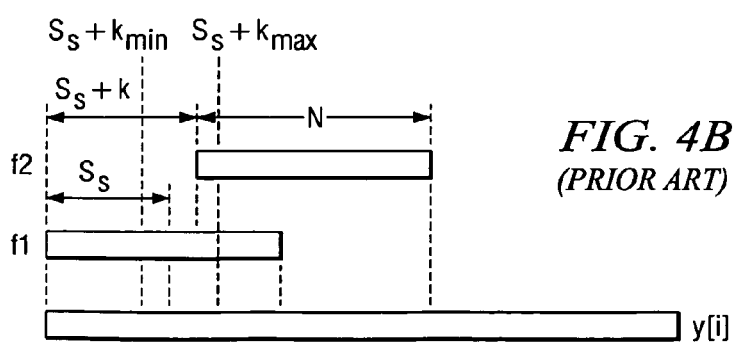
FIG. 4b illustrates the synthesis step in the synchronous overlap and add method of time-scale modification according to the prior art.

FIG. 4 illustrates the synchronous overlap-and-add time scale modification algorithm. The same variables are used in FIG. 4(a) for analysis as FIG. 3(a) and used in FIG. 4(b) for synthesis as in 3(b). In FIG. 4, k is the deviation of the overlap position, with k limited to the range between $k_{min}$ and $k_{max}$. Note that k=0 is equivalent to the overlap-and-add time scale modification algorithm illustrated in FIGS. 3(a) and 3(b). The synchronous overlap-and-add time scale modification algorithm requires a large amount of computation to calculate the normalized cross-correlation used in equation 1. The similarity computation can be reduced using a more efficient normalized cross-correlation formula or another measure of signal similarity instead of equation 1. Even such a reduced computation will still be the most computation-expensive part of the algorithm. The following discussion applies to whatever normalized cross-correlation formula or measure of signal similarity is used. This computation enables better phase matching for each overlapping frame, thus improving the resulting sound quality.

FIG. 5 is a flow chart illustrating process 500 including the basic phase vocoder as known in the art. At block 501 the input signal is analyzed at equally spaced overlapping windowed frames using a short-time discrete Fourier transform. The resulting data describes short time intervals of the audio data in the frequency domain. Next the phase difference for spectral peaks is calculated (block 502). This phase difference is the difference in phase between an input phase and a time scale modified signal phase. Block 502 uses an intrinsic sinusoidal model where the frequency is represented by the sum $\Omega_k+\omega_{ik}$: where carrier $\Omega_k$ is $2\pi k/N$; and $\omega_{ik}$ is an instantaneous frequency modulator. Block 502 estimates $\omega_{ik}$ for each spectral line by obtaining the phase difference between two consecutive analysis frames. Here, k is a spectral line number and N is the size of the short-time discrete Fourier transform.

Process 500 reconstructs an output signal from the analyzed frames using a short-time inverse discrete Fourier transform (block 503). The frames are overlapped by a different overlap factor to achieve the desired time scaling. The instantaneous frequency $\omega_{ik}$ is used to calculate the phase corresponding to each spectral line in the time shifted instant.

Figure 6:
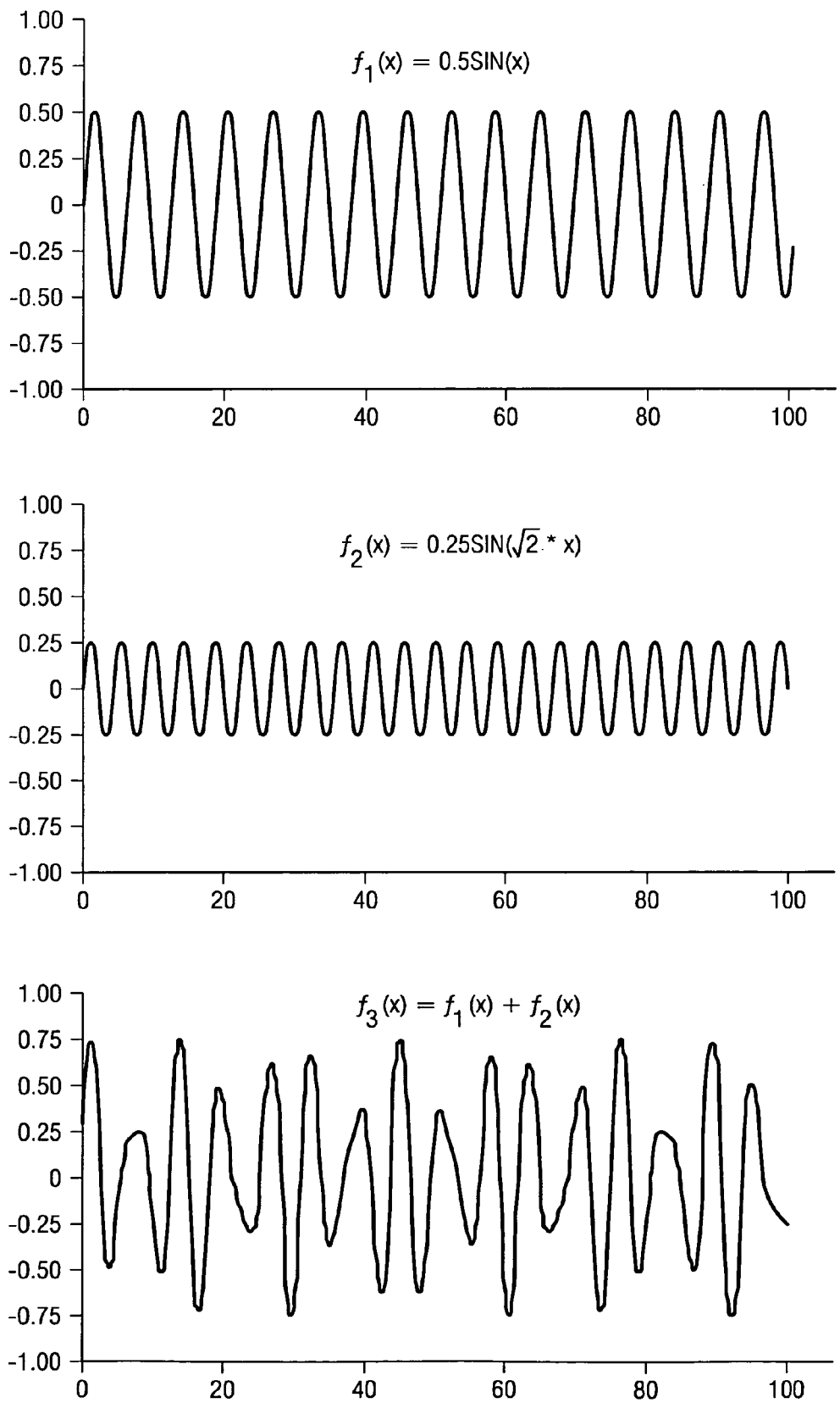
FIG. 6 is a view of several waveforms used in explanation of this invention.

Consider a simple signal consisting of non-harmonically related frequencies, such as $f_1=0.5 \sin(x)$ and $f_2=0.25 \sin(\sqrt{2}x)$ and their sum $f_3$ illustrated in FIG. 6. Because the signals $f_1$ and $f_2$ are not harmonically related, any instantaneous relationship between their respective phases will never be repeated exactly because a perfect match would require an integer number of periods of both signals. Thus a time-domain time-scale modification technique would try to find a close match within signal $f_3$ but there will always be some phase disruption when jumping to a different location. This phase match problem causes artifacts for many time-domain time-scale modification techniques. Now consider separating these components and performing a similar operation on each signal individually. In this case, there is little problem finding a perfect phase match for each signal, though it will be at different locations. Combining the resulting time-scaled signals produces an artifact-free time-scaled whole. Unfortunately in the real world, even narrow band signals do not repeat perfectly due to changes in pitch and amplitude, and to interference among close frequencies. However analysis in separate frequency bands gives each band great flexibility in finding the best overlap point. This improves overall quality.

TSM (time-scale modification) for audio and video equipment is becoming increasingly popular due to its wide range of applications: highly intelligible fast forward playback, audio "slow-motion" for foreign language training or the elderly, etc.

In high-end audio and video equipment, the switching between speed modes should be as imperceptible as possible, since any abrupt change or silence can be easily perceived by the listener as annoying artifacts. Ideally, the user should not be able to perceive speed transitions that would otherwise destroy the sensation of continuity. Once implemented as a speed control function, such feature would enable an array of special effects unseen in current audio equipment, such as a karaoke accompaniment system that can chase the solo singer instead of the other way round, or a song being continuously accelerated or slowed down during playback.

This invention shows a simple solution to the problem based on an improved time scale modification algorithm that keeps track of previously processed data to achieve continuity.

Figure 7A:
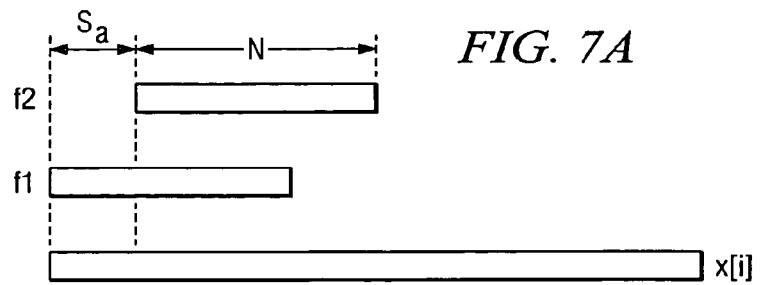
FIG. 7A illustrates the analysis steps for a constant output buffer size according to this invention.
Figure 7B:
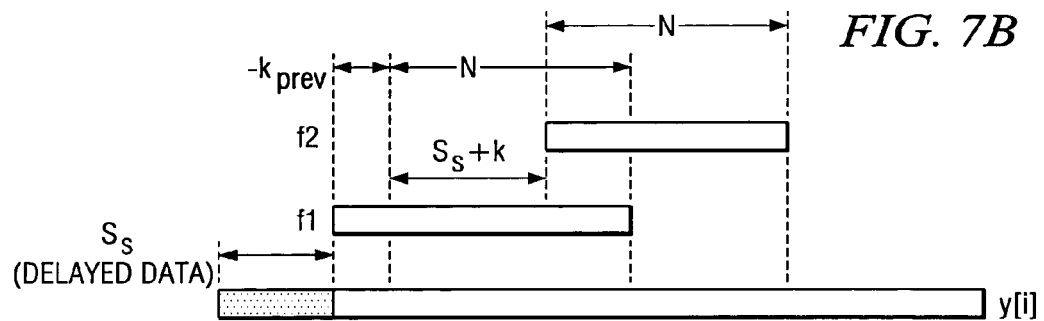
FIG. 7B illustrates the synthesis steps for a constant output buffer size according to this invention.

A practical problem has to be solved when implementing the time scale modification algorithm in a real-time system. Usually the speed change ratio and thus the size of input and output buffers has to meet some restrictions related to audio/video synchronization. However, the overlap offset varies between $k_{min}$ and $k_{max}$ as previously explained, and the desired ratio would be attained exactly only for k=0. Additionally, the difference would accumulate along successive frames. The solution is to compensate the previous value of k before setting the initial target for the next overlap value. In that manner, the total accumulated error would never exceed max ($|k_{min}|$, $|k_{max}|$). For applications that require exact input and output buffer sizes for every frame, a natural solution is to store one output chunk $S_s$ of delayed y[ ] and output the processed result of the previous frame. This is illustrated in FIGS. 7A and 7B. FIG. 7A illustrates the analysis steps for a constant output buffer size. FIG. 7B illustrates the synthesis steps for a constant output buffer size. The figure describes the situation where the previous overlap offset $k_{prev}$ was negative, so that the initial overlap target is positively compensated by $-k_{prev}$. The figure also shows the delayed y[ ] ready for output.

Figure 8A:
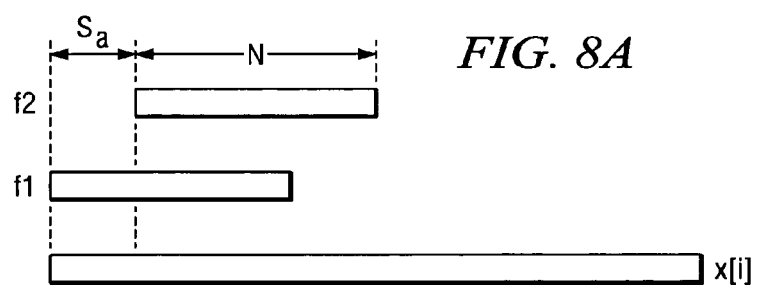
FIG. 8A illustrates the analysis steps for a controllable output buffer size according to this invention.
Figure 8B:
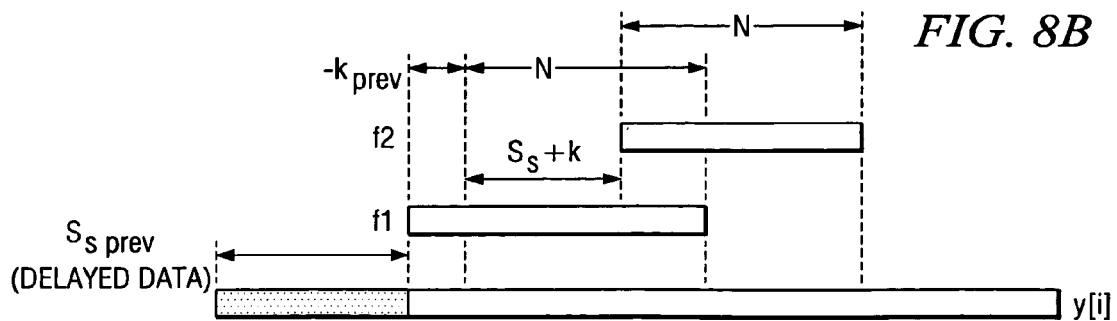
FIG. 8B illustrates the synthesis steps for a controllable output buffer size according to this invention.

The system of FIGS. 7A and 7B can be generalized in order to enable controllable output buffer size. The initial overlap target for the overlap-and-add processing (corresponding to k=0) is $S_s-k_{prev}$ where $S_s$ is the desired output buffer size and $k_{prev}$ is the previous offset value. The generalization consists of using a generic output buffer size $S_s'$ instead of $S_s$ that can be arbitrarily defined upon each frame. To ensure continuity of the processed data, the number of data to be actually output is no longer $S_s$ but $S_{s\_prev}$, which is the value of $S_s'$ corresponding to the last-processed frame. FIGS. 8A and 8B illustrate the process. FIG. 8A illustrates the analysis steps for a controllable output buffer size. FIG. 8B illustrates the synthesis steps for a controllable output buffer size according to this invention.

Using this algorithm, a system can be implemented where the client program requests an arbitrary number of output data, and the time scale modification system returns the number of data points corresponding to the last request.

The method shown in this invention was implemented and tested using 13 speed multipliers ranging from 0.5× to 2.0× normal playback in steps of ⅛, as shown in Table 1. The speed transitions during playback were found to be imperceptible.

TABLE 1

| Speed (vs. normal playback) | Input buffer size ($S_a$) | Output buffer size ($S_s$) |
| --- | --- | --- |
| 4/8 | 512 | 1024 |
| 5/8 | 640 | 1024 |
| 6/8 | 768 | 1024 |
| 7/8 | 896 | 1024 |
| 8/8 | 1024 | 1024 |
| 9/8 | 1024 | 910 |
| 10/8 | 1024 | 820 |
| 11/8 | 1024 | 744 |
| 12/8 | 1024 | 682 |
| 13/8 | 1024 | 630 |
| 14/8 | 1024 | 586 |
| 15/8 | 1024 | 546 |
| 16/8 | 1024 | 512 |

What is claimed is:

1. A method of time-scale modification of a digital audio signal comprising the steps of:
   analyzing the digital audio signal in a set of first equally spaced, overlapping time windows having a first overlap amount $S_a$,
   selecting a base overlap $S_s$ for output synthesis corresponding to a desired time scale modification,
   calculating a measure of similarity between overlapping frames for a range of overlaps k between $S_s+k_{min}$ to $S_s+k_{max}$ of the single audio signal setting the initial target for a next overlap value k equal to $S_s-k_{prev}$ where $k_{min}$ is a minimum overlap deviation, $k_{max}$ is a maximum overlap deviation and $k_{prev}$ is the previous offset value,
   determining an overlap deviation k yielding the largest measure of similarity for each frequency band, synthesizing an output signal in a set of second equally spaced, overlapping time windows having a second overlap amount equal to $S_s+k$; and producing a sound corresponding to said output signal.

2. The method of claim 1, wherein:

the digital audio signal is separated into a plurality of frequency bands;

each of the plurality of frequency bands is separately time-scale modified producing corresponding time-scale modified frequency band signals; and the separate time-scale modified frequency band signals are combined.

3. The method of claim 1, wherein:

said step of time-domain time-scale modification of the digital audio signal includes time-domain time-scale modification.

4. The method of claim 1, wherein:

said step of synthesizing an output signal includes storing one fixed output chunk $S_S$ of delayed output.

5. The method of claim 1, wherein:

said step of synthesizing an output signal includes using a variable output buffer size $S_s'$, where $S_s'$ may be arbitrarily defined for each frame and the number of data points generated in $S_s'$ corresponding to the last processed frame.

6. A digital audio apparatus comprising:

a source of a digital audio signal;

a digital signal processor connected to said source of a digital audio signal programmed to perform time scale modification on the digital audio signal by analyzing the digital audio signal in a set of first equally spaced, overlapping time windows having a first overlap amount $S_a$, selecting a base overlap $S_s$ for output synthesis corresponding to a desired time scale modification, calculating a measure of similarity between overlapping frames of each frequency band for a range of overlaps k between $S_s+k_{min}$ to $S_s+k_{max}$ of the single audio signal setting the initial target for a next overlap value k equal to $S_s-k_{prev}$ where $k_{min}$ is a minimum overlap deviation, $k_{max}$ is a maximum overlap deviation and $k_{prev}$ is the previous offset value, determining an overlap deviation k yielding the largest measure of similarity for each frequency band, synthesizing an output signal in a set of second equally spaced, overlapping time windows having a second overlap amount equal to $S_s+k$; and an output device connected to the digital signal processor for outputting the time scale modified digital audio signal.

7. The digital audio apparatus of claim 6, wherein:

the digital audio signal is separated into a plurality of frequency bands;

each of the plurality of frequency bands is separately time-scale modified producing corresponding time-scale modified frequency band signals; and the separate time-scale modified frequency band signals are combined.

8. The digital audio apparatus of claim 6, wherein:

said digital signal processor is programmed to implement time-domain time-scale modification of the digital audio signal.

9. The digital audio apparatus of claim 6, wherein:

said digital signal processor is programmed to synthesize an output signal using a variable output buffer size $S_s'$, where $S_s'$ may be arbitrarily defined for each frame and the number of data points generated in $S_s'$ corresponding to the last processed frame.

10. The digital audio apparatus of claim 6, wherein:

said digital signal processor is programmed to synthesize output signal including storing one fixed output chunk $S_S$ of delayed output.

* * * * *